US011636379B2

(12) United States Patent
Zhou

(10) Patent No.: US 11,636,379 B2
(45) Date of Patent: Apr. 25, 2023

(54) DISTRIBUTED CLUSTER TRAINING METHOD AND APPARATUS

(71) Applicant: Alibaba Group Holding Limited, Grand Cayman (KY)

(72) Inventor: Jun Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1160 days.

(21) Appl. No.: 16/141,886

(22) Filed: Sep. 25, 2018

(65) Prior Publication Data

US 2019/0026657 A1  Jan. 24, 2019

Related U.S. Application Data

(63) Continuation of application No. PCT/CN2017/077246, filed on Mar. 20, 2017.

(30) Foreign Application Priority Data

Mar. 26, 2016  (CN) .......................... 201610180393.8

(51) Int. Cl.
   *G06N 20/00* (2019.01)
   *G06F 9/38* (2018.01)
   *G06F 9/50* (2006.01)

(52) U.S. Cl.
   CPC ........... *G06N 20/00* (2019.01); *G06F 9/3828* (2013.01); *G06F 9/5027* (2013.01); *G06F 2209/505* (2013.01)

(58) Field of Classification Search
   None
   See application file for complete search history.

(56) References Cited

U.S. PATENT DOCUMENTS 8,656,406 B2 * 2/2014 Nakayama .......... H04L 67/1029
                                                   718/105
9,390,370 B2    7/2016 Kingsbury
(Continued)

FOREIGN PATENT DOCUMENTS

CN           103544528 A      1/2014
CN           104463324 A      3/2015
(Continued)

OTHER PUBLICATIONS

English Translation of the Japanese Office Action dated Apr. 6, 2021 for Japanese Patent Application No. 2018-549518, a foreign counterpart of U.S. Appl. No. 16/141,886, 2 pages.
(Continued)

*Primary Examiner* — Wynuel S Aquino
(74) *Attorney, Agent, or Firm* — Lee & Hayes, P.C.

(57) ABSTRACT

A distributed cluster training method and an apparatus thereof are provided. The method includes reading a sample set, the sample set including at least one piece of sample data; using the sample data and current weights to substitute into a target model training function for iterative training to obtain a first gradient before receiving a collection instruction, the collection instruction being issued by a scheduling server when a cluster system environment meets a threshold condition; sending the first gradient to an aggregation server if a collection instruction is received, wherein the aggregation server collects each first gradient and calculates second weights; and receiving the second weights sent by the aggregation server to update current weights. The present disclosure reduces an amount of network communications and an impact on switches, and avoids the use of an entire cluster from being affected.

20 Claims, 7 Drawing Sheets

(56) References Cited

U.S. PATENT DOCUMENTS

| | | | |
|---|---|---|---|
| 9,569,401 B2 | 2/2017 | Pechyony et al. | |
| 2005/0289089 A1* | 12/2005 | Abe | G06N 20/00 |
| | | | 706/20 |
| 2006/0123421 A1* | 6/2006 | Loboz | G06F 9/505 |
| | | | 718/105 |
| 2010/0179855 A1 | 7/2010 | Chen et al. | |
| 2012/0078825 A1* | 3/2012 | Kulkarni | G06F 16/24578 |
| | | | 706/12 |
| 2013/0290223 A1 | 10/2013 | Chapelle et al. | |
| 2015/0206067 A1 | 7/2015 | Abu-Mostafa et al. | |
| 2015/0324690 A1 | 11/2015 | Chilimbi et al. | |
| 2016/0103901 A1 | 4/2016 | Kadav et al. | |
| 2017/0076198 A1* | 3/2017 | Jin | G06N 3/08 |
| 2017/0220949 A1 | 8/2017 | Feng et al. | |

FOREIGN PATENT DOCUMENTS

| | | |
|---|---|---|
| CN | 104714852 A | 6/2015 |
| CN | 105005911 A | 10/2015 |
| JP | 2012022558 A | 2/2012 |

OTHER PUBLICATIONS

Translation of International Search Report dated Jun. 16, 2017, from corresponding PCT Application No. PCT/CN2017/077246, 2 pages.

The Japanese Office Action dated Apr. 6, 2021 for Japanese Patent Application No. 2018-549518, a foreign counterpart of U.S. Appl. No. 16/141,886, 2 pages.

Translation of Written Opinion dated Jun. 16, 2017, from corresponding PCT Application No. PCT/CN2017/077246, 5 pages.

Translation of CN Office Action from Corresponding CN Application No. 201610180393.8 dated Oct. 24, 2019, a counterpart foreign application for U.S. Appl. No. 16/141,886, 4 pages.

Translation of CN Office Action from Corresponding CN Application No. 201610180393.8 dated Oct. 17, 2019, a counterpart foreign application for U.S. Appl. No. 16/141,886, 2 pages.

* cited by examiner

DISTRIBUTED CLUSTER TRAINING METHOD AND APPARATUS

CROSS REFERENCE TO RELATED PATENT APPLICATIONS

This application claims priority to and is a continuation of PCT Patent Application No. PCT/CN2017/077246 filed on 20 Mar. 2017, and is related to and claims priority to Chinese Patent Application No. 201610180393.8, filed on 26 Mar. 2016, entitled "Distributed Cluster Training Method and Apparatus," which are hereby incorporated by reference in their entirety.

TECHNICAL FIELD

The present disclosure relates to the technical field of machine training technologies, and particularly to distributed cluster training methods and apparatuses.

BACKGROUND

Along with applications of big data, many target models that are based on big data, such as target models that forecast users' preferences of products, all requiring weights in the target models to be trained using corresponding sample data. The weights can be understood as respective parameters of the target models. For example, in a simple model $y=ax1+bx2+cx3$, a, b, and c are weights, x1, x2, and x3 are input quantities, and y is an output quantity. The above target models all require the use of machine learning for training.

Machine learning training generally includes stand-alone training and cluster training. The stand-alone training uses all samples to calculate a gradient of $F(X)$ (F is a loss function and X is weights): $\nabla F(Xt-1)$, and the weights are then updated iteratively: $Xt=Xt-1-\alpha \nabla F(Xt-1)$, until convergence is reached. The cluster training is to first distribute training samples to each machine (data on each machine is not the same) according to certain rules, with each machine calculating a gradient and then using a reduce technique to summarize the gradients and update weights. The above process is repeated until convergence is reached. In fact, due to the large amount of data, the cluster training has become a standard in the industry.

On the other hand, when training is performed on a stand-alone machine, and an amount of data of sample data is so large that it cannot be loaded into memory, this results in an inability of performing training. Training on a stand-alone machine does not have a communication (network) cost, but cannot support big data (such as browsing log data associated with all users in the past two weeks).

Based on the above problems of the stand-alone training, existing technologies adopt execute tasks of machine learning using a distributed cluster. An existing solution of cluster training: (1) dividing a data set T into N parts according to certain rules to obtain $T=\{T1, T2, \ldots, Tn\}$; (2) obtaining a piece of data by each training server, and setting as Tx; (3) calculating a corresponding gradient $\nabla FTx$ by each training server using the obtained data; (4) performing a gradient summary to obtain a total gradient: total gradient=$\Sigma 1nFi$; (5) updating weights according to rules (similar to the weight updating method of the stand-alone training), and re-sending new weights to all machines; (6) determining whether the training is completed, and returning to the third operation if not.

Training on a cluster can use more training data to achieve a better prediction result. Since gradients are summarized after each round of calculation of the gradients, the communication traffic is huge and frequent, which may cause the network traffic in the cluster to reach above its capacity, thus affecting switches and even the use of the entire cluster.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, embodiments of the present disclosure provide a distributed cluster training method and a corresponding distributed cluster training apparatus to overcome the above problems or at least partially solve the above problems.

In order to solve the above problems, the present disclosure discloses a distributed cluster training method, which includes reading a sample set, the sample set including at least one piece of sample data; using the sample data and current weights to substitute into a target model training function for iterative training to obtain a first gradient before receiving a collection instruction, the collection instruction being issued by a scheduling server when a cluster system environment meets a threshold condition, wherein first weights are generated based on first gradients obtained in a previous training and are used as current weights of a subsequent iteration of the iterative training, if multiple iterations of the training exist before receiving the collection instruction; sending the first gradient to an aggregation server if a collection instruction is received, the aggregation server collecting each first gradient and calculating second weights; and receiving the second weights sent by the aggregation server to update current weights.

The present disclosure also discloses a distributed cluster training apparatus, which includes a sample reading module used for reading a sample set, the sample set including at least one piece of sample data; an iterative training module used for using the sample data and current weights to substitute into a target model training function for iterative training to obtain a first gradient before receiving a collection instruction, the collection instruction being issued by a scheduling server when a cluster system environment meets a threshold condition, wherein first weights are generated based on first gradients obtained in a previous training and are used as current weights of a subsequent iteration of the iterative training, if multiple iterations of the training exist before receiving the collection instruction; a result sending module used for sending the first gradient to an aggregation server if a collection instruction is received, the aggregation server collecting each first gradient and calculating second weights; and an updating module used for receiving the second weights sent by the aggregation server to update current weights.

The embodiments of the present disclosure include the following advantages.

In implementations, a training server can use a sample set read by the training server to continuously iteratively train a first gradient using the sample data and current weights in the sample set before receiving a collection instruction. At the same time, a scheduling server can monitor a cluster system environment whether a threshold condition is met. In response to detecting that the cluster system environment meets the threshold condition, the system can send a collection instruction to each training server, and each training server sends a first gradient obtained from training to an aggregation server. The aggregation server aggregates the first gradients and calculates second weights. Before each training server has finished training its sample data, the second weights are sent to each training server to update current weights thereof. In this way, the system monitors the system environment, and control when a collection instruction is issued, and correspondingly the training servers send first gradients to the aggregation server after receiving the collection instruction, without sending training results to the server at the end of each round of training in the entire process, thus reducing the network traffic and the impact on switches, and preventing from affecting the use of the entire cluster.

DETAILED DESCRIPTION

To make the above objectives, features, and advantages of the present disclosure more comprehensible, the present disclosure is described in detail herein in conjunction with accompanying drawings and specific implementations.

One of the concepts of the embodiments of the present disclosure is that, since gradients trained by training servers in a cluster are directly collected after each round of training when a target model in the cluster is trained in existing technologies, this leads to a huge amount of traffic frequently, and may cause the network traffic in the cluster to reach above its capacity, thereby affecting the use of switches or even the entire cluster. In implementations, a training server can use a sample set read by the training server to continuously iteratively train a first gradient using the sample data and current weights in the sample set before receiving a collection instruction. At the same time, a system can monitor a cluster system environment whether a threshold condition is met, and the threshold condition can avoid an occurrence of the network traffic reaching a capacity thereof in the cluster system environment. In response to detecting that the cluster system environment meets the threshold condition, the system can send a collection instruction to each training server, and each training server sends a first gradient obtained from training to an aggregation server. The aggregation server aggregates various first gradients and calculates second weights. Before each training server has finished training sample data thereof, the second weights are sent to each training server to update current weights thereof. In this way, the system monitors the system environment, and control a time when a collection instruction is issued. Correspondingly the training servers send first gradients to the aggregation server after receiving the collection instruction, without sending training results to the server at the end of each round of training in the entire process, Therefore, the network traffic and the impact on switches are reduced, thus preventing from affecting the use of the entire cluster.

First Embodiment

Figure 1:
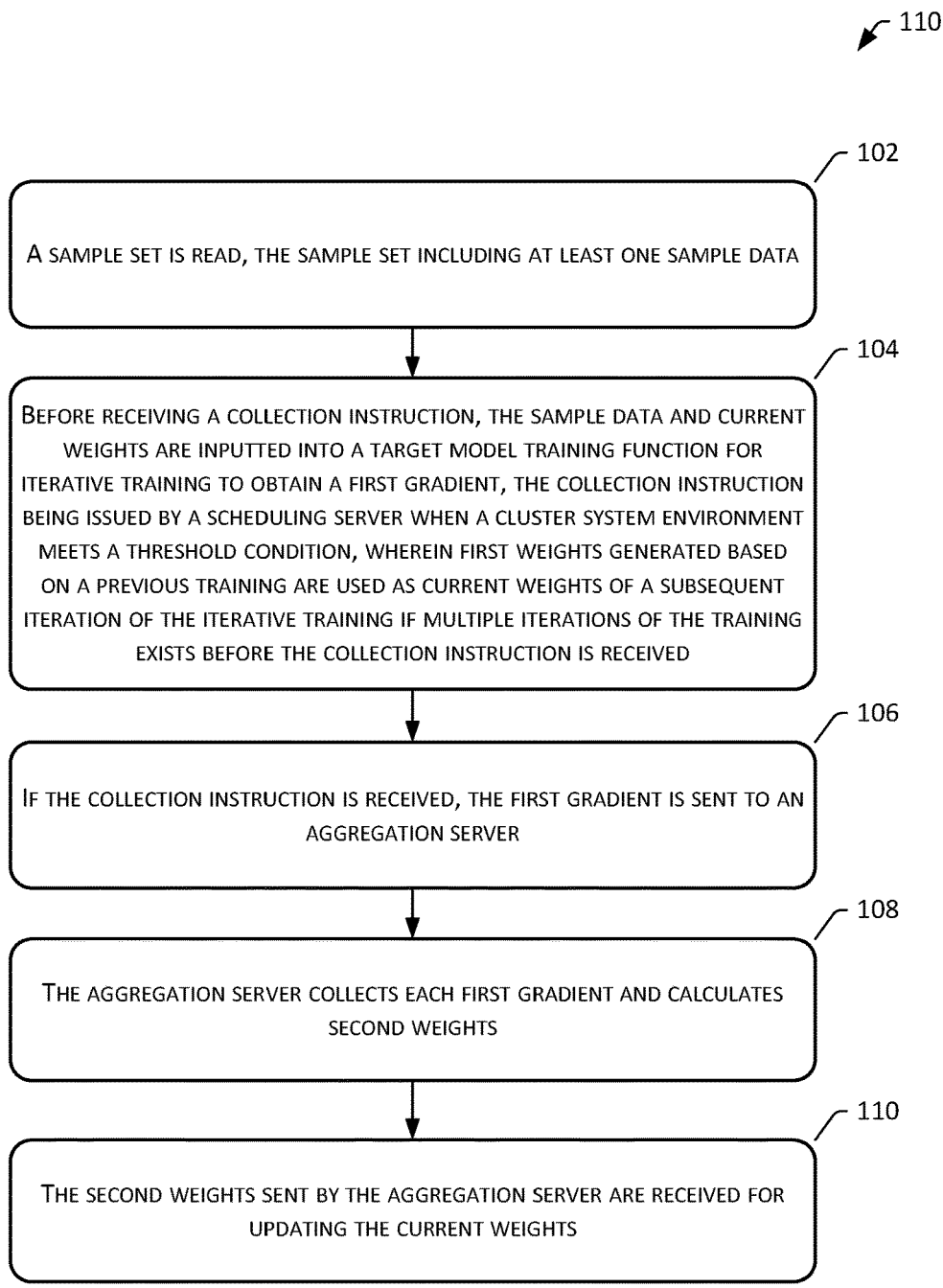
FIG. 1 is a flowchart of an embodiment of a distributed cluster training method of the present disclosure.

Referring to FIG. 1, a flowchart of an embodiment of a distributed cluster method 100 of the present disclosure is shown, which may specifically include the following operations.

Operation 102: A sample set is read, the sample set including at least one sample data.

In implementations, an entire cluster may include multiple training servers, at least one scheduling server, and at least one aggregation server. The training server cans obtain a sample set that is responsible thereby for iterative training to obtain a first gradient. The scheduling server can monitor a cluster system environment of an entire system, and determine whether to issue a collection instruction to the training servers according to the cluster system environment. The aggregation server may receive a first gradient sent by each training server and calculate second weights.

In implementations, communication data between the training servers, the scheduling server, and the aggregation server is transmitted through switches in the cluster.

It can be understood that the scheduling server in implementations may send acquisition parameters of a sample set that needs to be obtained by each training server to each training server. After receiving the acquisition parameters, a training server may read a sample set needed thereby from a designated location according to the acquisition parameters. For example, a set of transaction log data specified by the parameters is obtained from a transaction log server as a sample set. Apparently, the embodiments of the present disclosure may also obtain a corresponding sample set from other servers, and may be set according to requirements. The embodiments of the present disclosure do not have any limitations thereon.

Operation 104: Before receiving a collection instruction, the sample data and current weights are inputted into a target model training function for iterative training to obtain a first gradient, the collection instruction being issued by a scheduling server when a cluster system environment meets a threshold condition, wherein first weights generated based on a previous training are used as current weights of a subsequent iteration of the iterative training if multiple iterations of the training exists before the collection instruction is received.

For a training server A, after reading a sample set, various current weights of a target model are initially second weights X0 that are empirically determined in advance. At this point, pieces of sample data may be extracted sequentially from the sample set, and inputted into the target model for training to train a first gradient belonging to the training server A.

The training server A can continuously read the sample data for iterative training before receiving a collection instruction. In real applications, each training server can apparently read and store all training samples thereof locally, and then perform training. For example, sample data M1 and a current weight X0 in the first round are inputted into a target model training function to train a first gradient $\nabla F(X0)$, and $\nabla F(X0)$ is then used to a calculate weight X1, with X1 acting as the current weight of the second round of training. Then sample data M2 and the current weights X1 are then inputted into the target model training function to train a first gradient $\nabla F(X1)$; and so on until a collection instruction is received. Where Xi (i=1, 2, 3, . . . ) is a multidimensional vector, where each dimension corresponds to a parameter in the target model. The target model training function may be a loss function $F(X)$ as described in the foregoing description.

In practical applications, the above process is taken as an example. In the first round, first sample data is substituted into a loss function $F(X)$, where X is a current weight. A gradient $\nabla F(X)$ of $F(X)$ is then calculated, and the first gradient $\nabla F(X1)$ is updated according to the formula $Xt=Xt-1-\alpha\nabla F(Xt-1)$. The loss function $F(X)$ can be set according to actual situations, and existing technologies have a detailed process thereof, which is not repeated herein. A similar process is performed for the second round. A training server is assumed to perform training to the third round, and obtain a first gradient $\nabla F(X2)$. At this time, if a collection instruction sent by a scheduling server is received, the first gradient $\nabla F(X2)$ may be directly sent to an aggregation server through the switches.

In implementations, the training server records a number of rounds of training for the first gradient after a previous collection. When sending a collection instruction, the scheduling server controls which round of the first gradient that the training server sends. The scheduling server may control each training server to perform N rounds of training before sending the collection instruction, where N is an integer greater than zero. For example, training servers are informed to perform only three rounds of training before receiving a collection instruction, and waits for an instruction of the scheduling server if the three rounds of training are completed. Apparently, in practical applications, N can be limited, and a value of N can also be set based on an accuracy error of training of actual requirements. The accuracy error of training of the actual requirements can be set based on experience of historical training results.

In implementations, a collection instruction sent by the scheduling server to each training server includes a designated number of rounds. Each training server then sends a first gradient obtained from a corresponding round of training to the aggregating server.

In implementations, during an iterative training of each training server, the scheduling server monitors a cluster system environment. When the cluster system environment meets a threshold condition, the scheduling server issues a collection instruction to each training server. The threshold condition may limit a sending frequency of a training server not to be too high to cause network congestion. An example of a threshold condition is a network utilization being lower than 30%.

In implementations, issuing the collection instruction by the scheduling server when the cluster system environment meets the threshold condition includes Issuing the collection instruction by the scheduling server when a cluster network utilization of an entire cluster meets a first threshold condition.

In implementations, the scheduling server may monitor the cluster network utilization of the entire cluster, for example, obtaining an amount of issued and received packets of a network card of each server, and the network card itself has a maximum flow limit, such as 100M. An amount of issued and received packets of each network card is determined, and divided by a total flow limit of all network cards. As such, the cluster network utilization can be obtained. Apparently, it is also possible to calculate the utilization of each server's network card, and the utilization of each network card is then weighted and averaged to obtain the cluster network utilization. In this case, the first threshold condition includes the cluster network utilization being lower than the first threshold. For example, the first threshold is set to 30%. Then, when the scheduling server monitors and detects that cluster network utilization is lower than 30%, a collection instruction can be sent to each training server.

In implementations, issuing the collection instruction is issued by the scheduling server when the cluster system environment meets the threshold condition includes issuing the collection instruction by the scheduling server when a cluster failure rate of an entire cluster meets a second threshold condition.

In implementations, each server in the entire cluster may fail. Therefore, the embodiments of the present disclosure may monitor the failure of each server, and then obtain a failure rate of the cluster according to the number of failed servers divided by the number of servers in the entire cluster. Apparently, in implementations, only a first number of failures of training servers may be monitored, and then the first number is divided by the number associated with the entire cluster to obtain a cluster failure rate. Apparently, the first number may also be divided by the number of all training servers to get a cluster failure rate. In this case, the second threshold condition includes a cluster failure rate being lower than a second threshold. For example, if the second threshold is set to 5%, the scheduling server may issue a collection instruction to each training server when the cluster failure rate is less than 5%.

It should be noted that server failures as described in the foregoing description include no response from a server due to a crash, and a delay in a response of a server exceeding a certain period of time. In implementations, the scheduling server may periodically send a test instruction to each server. If a server does not respond prior to a specified time, a failure may be considered to have occurred in the server.

Apparently, in implementations, before issuing a collection instruction, the scheduling server may also monitor training conditions of each training server. For example, after monitoring that each training server has completed at least one round of training since a previous collection instruction is sent, a collection instruction is issued after the foregoing threshold requirement(s) is/are met.

Operation 106: If the collection instruction is received, the first gradient is sent to an aggregation server.

Operation 108: The aggregation server collects each first gradient and calculates second weights.

In implementations, if a collection instruction is received, a training server may send a first gradient that is most recently updated to the aggregation server.

Since the collection instruction has a round of training, each training server sends a first gradient of the same round to the aggregation server.

In implementations, if multiple aggregation servers exist, each training server may send a respective first gradient to a corresponding aggregation server according to a preset correspondence relationship with the aggregation server. Each aggregation server collects received parts of first gradients, and then each aggregation server re-sends the collected first gradients to an aggregation server, which then performs a final collection, and calculates second weights based on finally collected first gradients.

After receiving first gradients of all training servers, the aggregation server may aggregate the first gradients, and then calculate second weights according to an aggregated result.

At this time, the aggregation server can determine whether training has been completed by each training server, and if training is not completed, the second weights are sent to each training server.

It can be understood that, in practical applications, each training server may send a first identifier indicating whether training of all sample data of a sample set is completed when a first gradient is sent. If the first identifier is no, this indicates that training is not completed. If the first identifier is yes, this indicates that training is completed. The aggregation server can determine whether a respective training server has trained all sample data of a sample set based on the identifier. Apparently, in real applications, the aggregation server may determine whether each training server has trained all sample data of a sample set by other means, which are not limited in implementations.

Operation 110: The second weights sent by the aggregation server are received for updating the current weights.

A training server can receive second weights sent by the aggregation server before training of sample data is completed. In this case, the training server can update current weights with the second weights, and then read subsequent sample data for a next round of training. Apparently, if the sample data has been read locally, a next round of the sample data can be read locally for the next round of training.

In implementations, a training server may use a sample set read by the training server to continuously and iteratively train a first gradient using sample data in the sample set and current weights before receiving a collection instruction. At the same time, the system can monitor whether a cluster system environment meets a threshold condition. The threshold condition can prevent the network traffic from reaching its capacity in the cluster system environment. When the system monitors that the cluster system environment meets the threshold condition, the collection instruction can be sent to each training server, and each training server will send a first gradient obtained from training to an aggregation server. The aggregation server aggregates each first gradient, calculates second weights, and sends the second weights to each training server before each training server completes training sample data thereof to update current weights thereof. Thus, the system monitors the system environment and controls the timing of sending the collection instruction, and the training servers send first gradients to the aggregation server only after receiving the collection instruction. Therefore, training results will not be sent to the server at the end of each round of training in the entire process, thus reducing the network traffic and the impact on switches, and avoiding the use of the entire cluster from being affected.

Second Embodiment

Figure 2:
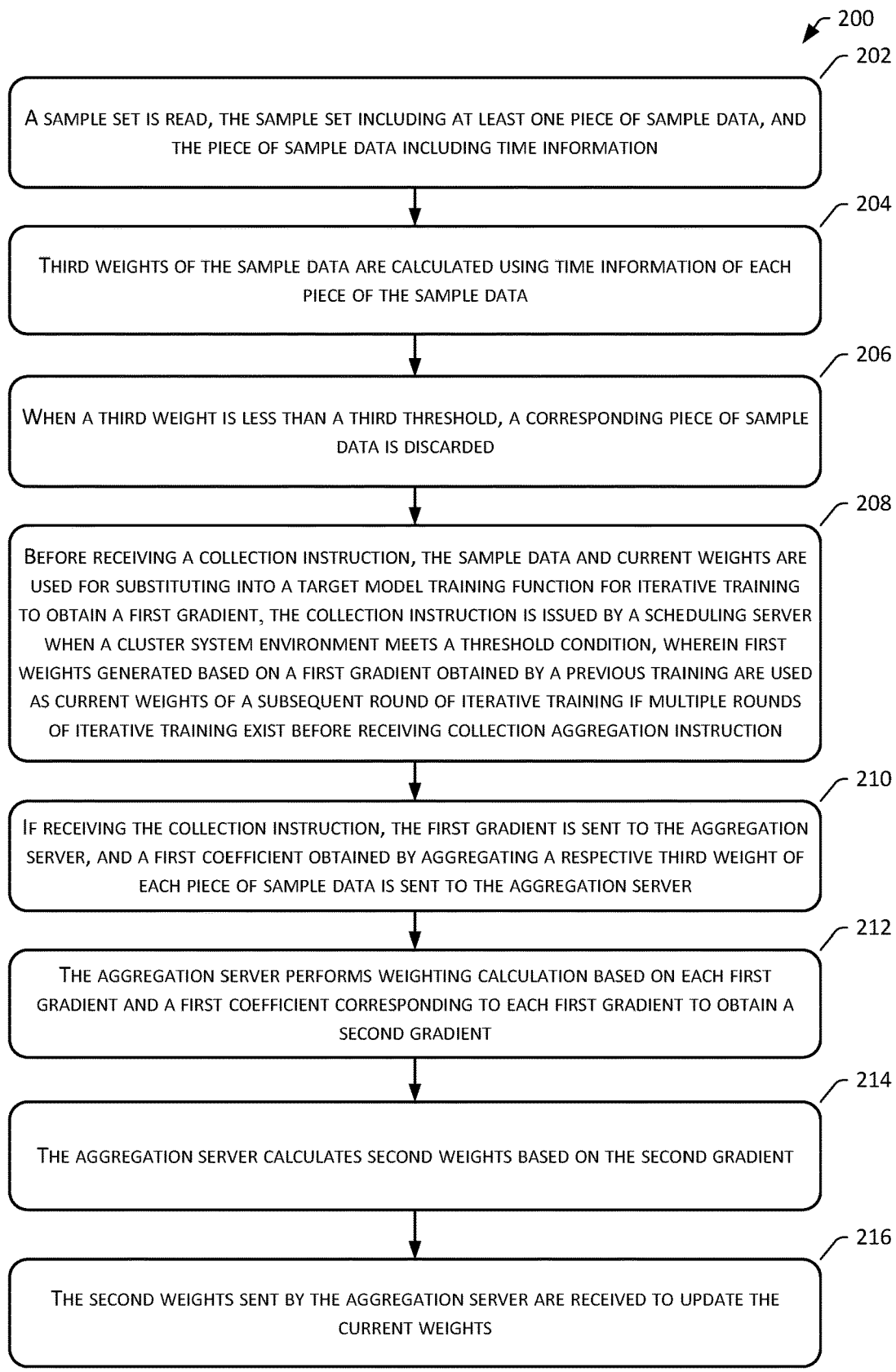
FIG. 2 is a flowchart of another embodiment of a distributed cluster training method of the present disclosure.

Referring to FIG. 2, a flowchart of another embodiment of a distributed cluster training method 200 of the present disclosure is shown, which may specifically include the following operations.

Operation 202: A sample set is read, the sample set including at least one piece of sample data, and the piece of sample data including time information.

In implementations, in addition to traditional data, such as a user ID, user transaction activities, the collection activity data, the browsing activity data, and the like, additional data is added to a piece of sample data. Such additional data records a time of production of the piece of sample data, for example, transaction data of the most recent day, transaction data of the last two days.

Operation 204: Third weights of the sample data are calculated using time information of each piece of the sample data.

In implementations, the more recent the sample data is, the more the user's real interest and intention is reflected, and a model trained by the sample data is more accurate. The present disclosure can calculate third weights of the sample data using time information of each piece of the sample data. The third weights indicate that the closer time information of a piece of the sample data to the current time is, the higher a weight is. Conversely, the lower the weight is.

In implementations, calculating the third weights of the sample data using the time information of each piece of the sample data includes:

Sub-operation 221: The time information of each piece of the sample data is substituted into a negative exponential parameter of an exponential function to calculate the third weights.

In implementations, time information from the current time can be converted into digital information. For example, time information of a piece of sample data N1 is 1, indicating that a distance of the piece of sample data N1 from the current time is 1 day, and time information of a piece of sample data N2 is 3, indicating that a distance of the piece of sample data N2 from the current time is 3 days. Apparently, other methods may be used for conversion of time information into digital information, which are not limited in implementations.

In implementations, a base number of the exponential function may be set to a natural number e, or may be set to other numbers greater than one. Preferably, the natural number e is employed. Then, the application can calculate the third weights using e-x, where x is time information. For example, a third weight is e−1 for N1, and so on. Apparently, other base numbers can be used as the base number of the exponential function, such as 2. In this case, the exponential function becomes 2-x.

Operation 206: When a third weight is less than a third threshold, a corresponding piece of sample data is discarded.

For example, the third threshold is set to 0.001. When a third weight is less than the third threshold, this indicates that an associated piece of sample data is too far away from the current time. Such piece of sample data has little influence on a user's interest and intention, and may be discarded. This reduces the amount of computation and saves system resources.

Operation 208: Before receiving a collection instruction, the sample data and current weights are used for substituting into a target model training function for iterative training to obtain a first gradient, the collection instruction is issued by a scheduling server when a cluster system environment meets a threshold condition, wherein first weights generated based on a first gradient obtained by a previous training are used as current weights of a subsequent round of iterative training if multiple rounds of iterative training exist before receiving collection aggregation instruction.

Operation 210: If receiving the collection instruction, the first gradient is sent to the aggregation server, and a first coefficient obtained by aggregating a respective third weight of each piece of sample data is sent to the aggregation server.

In implementations, before training data of the sample set, the training server may calculate a third weight of each piece of sample data, and may then aggregate third weights of each retained piece of sample data to obtain a first coefficient.

Operation 212: The aggregation server performs weighting calculation based on each first gradient and a first coefficient corresponding to each first gradient to obtain a second gradient.

Operation 214: The aggregation server calculates second weights based on the second gradient.

For example, a training server A sends a first gradient ∇F(X1)A with a first coefficient of 0.8. A training server B sends a first gradient ∇F(X1)B with a first coefficient of 0.7. A training server C sends a first gradient ∇F(X1)C with a first coefficient of 0.5. As such, a second gradient is (0.8∇F(X1)A+0.7∇F(X1)B+0.5≡F(X1)C)

Second weights are then calculated from the second gradient.

The second weights can then be sent to each training server that has not completed training as described in the first embodiment.

Operation 216: The second weights sent by the aggregation server are received to update the current weights.

In implementations, a training server may use a sample set read by the training server to continuously and iteratively train a first gradient using sample data in the sample set and current weights before receiving a collection instruction. At the same time, the system can monitor whether a cluster system environment meets a threshold condition. The threshold condition can prevent the network traffic from reaching its capacity in the cluster system environment. When the system monitors that the cluster system environment meets the threshold condition, the collection instruction can be sent to each training server, and each training server will send a first gradient obtained from training to an aggregation server. The aggregation server aggregates each first gradient, calculates second weights, and sends the second weights to each training server before each training server completes training sample data thereof to update current weights thereof. Thus, the system monitors the system environment and controls the timing of sending the collection instruction, and correspondingly the training servers send first gradients to the aggregation server only after receiving the collection instruction. Therefore, training results will not be sent to the server at the end of each round of training in the entire process, thus reducing the network traffic and the impact on switches, and avoiding the use of the entire cluster from being affected.

In addition, the embodiments of the present disclosure can automatically increase a weight of a new piece of data, reduce a weight of an old piece of data, and discard some old pieces of data based on the timeliness of the data, so that a target model is more suitable for a user's current behavior, and can reduce an amount of computation.

Third Embodiment

Figure 3:
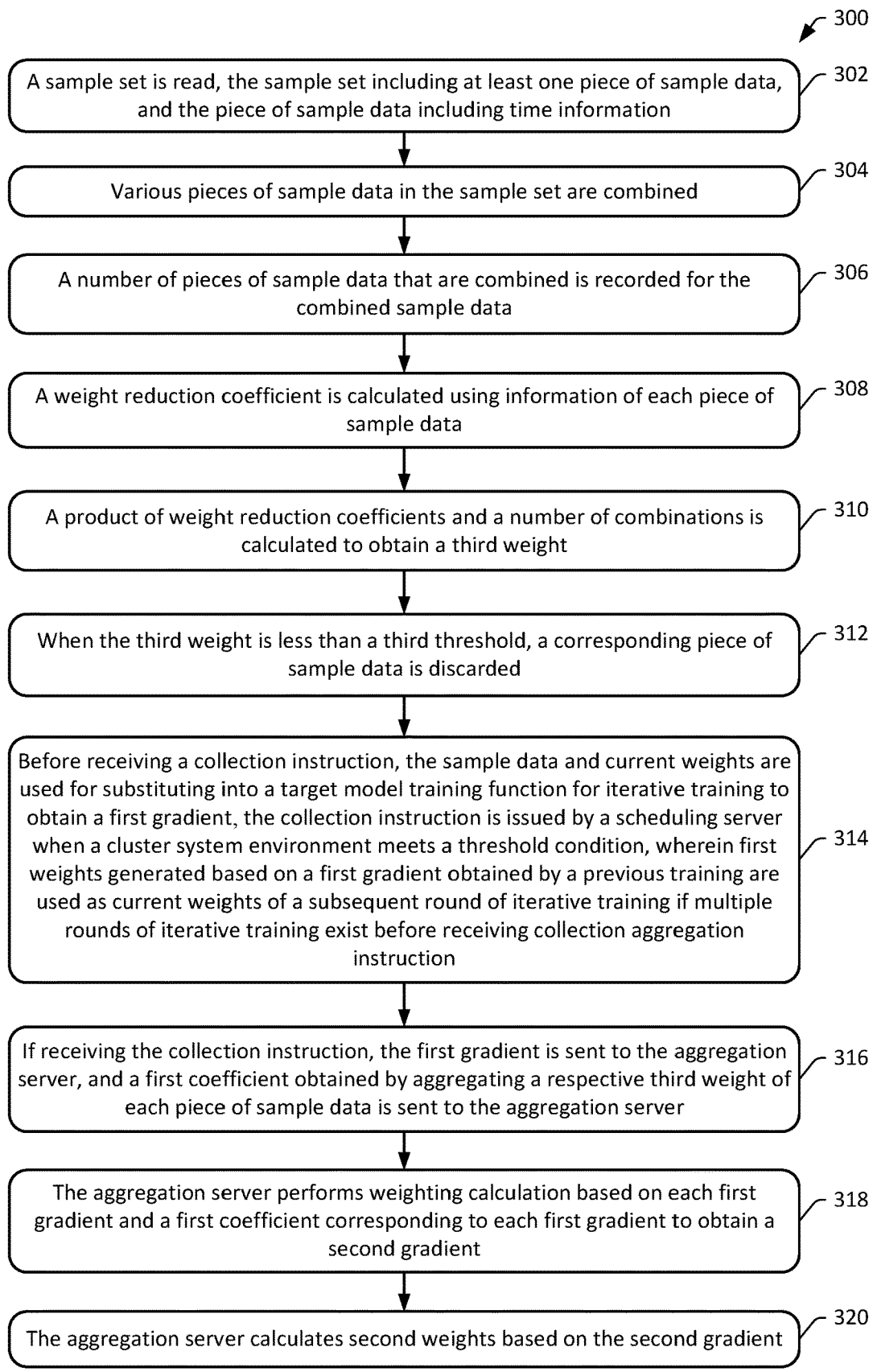
FIG. 3 is a flowchart of another embodiment of a distributed cluster training method of the present disclosure.

Referring to FIG. 3, a flowchart of another embodiment of a distributed cluster training method 300 of the present disclosure is shown, which may specifically include the following operations.

Operation 302: A sample set is read, the sample set including at least one piece of sample data, and the piece of sample data including time information.

Operation 304: Various pieces of sample data in the sample set are combined.

Operation 306: A number of pieces of sample data that are combined is recorded for the combined sample data.

In implementations, pieces of sample data having the same content may be combined according to a same time period. For example, user A bought commodity A at 10:00 am on Dec. 12, 2015, and bought commodity A at 3 pm on 2015 Dec. 31. These two pieces of sample data can then be combined, and user A has purchased commodity A in 2015 Dec. 31, and the number of combination is 2.

In practice, for the sample data, a column of a combination number column can also be added, and numbers of combination are filled into this column.

Operation 308: A weight reduction coefficient is calculated using information of each piece of sample data.

In implementations, time information of each piece of sample data may be used to calculate a weight reduction coefficient. The closer to the current time is, the higher the weight reduction coefficient is. Conversely, the lower the weight reduction coefficient is.

In implementations, calculating the weight reduction coefficient using the time information of each piece of sample data includes:

Sub-operation C11: The time information of each sample data is substituted into a negative exponential parameter of an exponential function to calculate a weight reduction coefficient.

In implementations, time information from the current time can be converted into digital information. For example, time information of a piece of sample data N1 is 1, indicating that a distance of the piece of sample data N1 from the current time is 1 day, and time information of a piece of sample data N2 is 3, indicating that a distance of the piece of sample data N2 from the current time is 3 days. Apparently, other methods may be used for conversion of time information into digital information, which are not limited in implementations.

Accordingly, the application can calculate the weight reduction coefficient using e-x, where x is time information. For example, a weight reduction coefficient is e−1 for N1, and so on. Apparently, other base numbers can be used as the base number of the exponential function, such as 2. In this case, the exponential function becomes 2-x.

Operation 310: A product of weight reduction coefficients and a number of combinations is calculated to obtain a third weight.

In implementations, if sample data is combined, the sample data in a sample set is combined sample data, and then the combined data of the sample data may be multiplied by a weight reduction coefficient thereof to obtain a third weight.

It can be understood that operations 308-310 can be preferred operations of operation 204 in the second embodiment.

Operation 312: When the third weight is less than a third threshold, a corresponding piece of sample data is discarded.

Operation 314: Before receiving a collection instruction, the sample data and current weights are used for substituting into a target model training function for iterative training to obtain a first gradient, the collection instruction is issued by a scheduling server when a cluster system environment meets a threshold condition, wherein first weights generated based on a first gradient obtained by a previous training are used as current weights of a subsequent round of iterative training if multiple rounds of iterative training exist before receiving collection aggregation instruction.

Operation 316: If receiving the collection instruction, the first gradient is sent to the aggregation server, and a first coefficient obtained by aggregating a respective third weight of each piece of sample data is sent to the aggregation server.

Operation 318: The aggregation server performs weighting calculation based on each first gradient and a first coefficient corresponding to each first gradient to obtain a second gradient.

Operation 320: The aggregation server calculates second weights based on the second gradient.

In implementations, the system monitors the system environment and controls the timing of sending the collection instruction, and correspondingly the training servers send first gradients to the aggregation server only after receiving the collection instruction. Therefore, training results will not be sent to the server at the end of each round of training in the entire process, thus reducing the network traffic and the impact on switches, and avoiding the use of the entire cluster from being affected.

In addition, the embodiments of the present disclosure combined pieces of sample data, and reduce the number of samples that are trained, thus improving the training speed.

In addition, the embodiments of the present disclosure can automatically increase a weight of a new piece of data, reduce a weight of an old piece of data, and discard some old pieces of data based on the timeliness of the data, so that a target model is more suitable for a user's current behavior, and can reduce an amount of computation.

Fourth Embodiment

Figure 4:
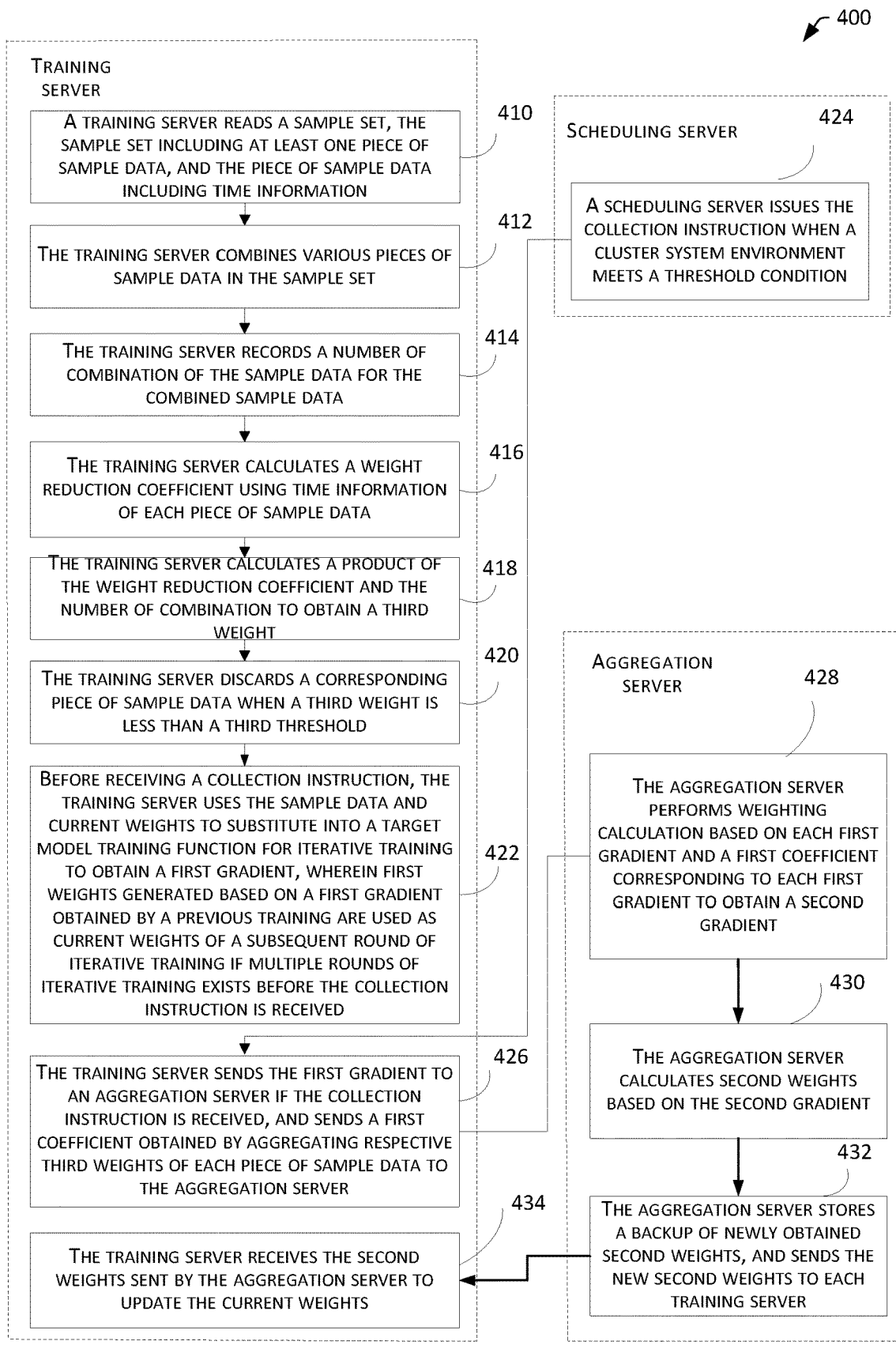
FIG. 4 is a flowchart of another embodiment of a distributed cluster training method of the present disclosure.

Referring to FIG. 4, a flowchart of another embodiment of a distributed cluster training method 400 of the present disclosure is shown, which may specifically include the following operations.

Operation 410: A training server reads a sample set, the sample set including at least one piece of sample data, and the piece of sample data including time information.

Operation 412: The training server combines various pieces of sample data in the sample set.

Operation 414: The training server records a number of combinations of the sample data for the combined sample data.

Operation 416: The training server calculates a weight reduction coefficient using time information of each piece of sample data.

Operation 418: The training server calculates a product of the weight reduction coefficient and the number of combination to obtain a third weight.

It can be understood that operations 416-418 may be preferred operations of operation 204 in the second embodiment.

Operation 420: The training server discards a corresponding piece of sample data when a third weight is less than a third threshold.

Operation 422: Before receiving a collection instruction, the training server uses the sample data and current weights to substitute into a target model training function for iterative training to obtain a first gradient, wherein first weights generated based on a first gradient obtained by a previous training are used as current weights of a subsequent round of iterative training if multiple rounds of iterative training exists before the collection instruction is received.

Operation 424: A scheduling server issues the collection instruction when a cluster system environment meets a threshold condition, and the scheduling server sends the collection instruction to each training server.

Operation 426: The training server sends the first gradient to an aggregation server if the collection instruction is received, and sends a first coefficient obtained by aggregating respective third weights of each piece of sample data to the aggregation server.

Operation 428: The aggregation server performs weighting calculation based on each first gradient and a first coefficient corresponding to each first gradient to obtain a second gradient.

Operation 430: The aggregation server calculates second weights based on the second gradient.

Operation 432: The aggregation server stores a backup of newly obtained second weights, and sends the new second weights to each training server.

In implementations, after new second weights are obtained, the aggregation server may save a backup of the second weights.

In implementations, storing the backup of the newly obtained second weights by the aggregation server includes:

Operation D11: The aggregation server determines whether an amount of change between the newly obtained second weights and second weights of a previous backup exceeds a change threshold.

Operation D12: If the change threshold is exceeded, the newly obtained second weights are backed up.

In implementations, the aggregation server obtains new second weights, and calculates an amount of change with respect to second weights of at least one of previous backups, for example, whether an amount of change between the second weights and the last weights of the previous backups is less than a change threshold, such as 5%. If being less than 5%, the new second weights are discarded. If being greater than or equal, the second weights are backed up. As such, a number of backups can be reduced. At operation C13, a target model of an external service server may not be updated, thereby avoiding an unnecessary impact on the use of the target model by the service server, such as testing.

It can be understood that weights are backed up, and therefore, if an entire training fails at a certain time, the scheduling server can notify the aggregation server to send the latest second weights of the backup to the training servers when training is restarted, so that the training servers can use the latest second weights as initial values of current weights and continue to perform training in conjunction with previous samples, thus improving the efficiency of training.

Apparently, in the embodiment of the present disclosure, after the training fails, the training may also be started from the first sample, but the current weights are the latest second weights of the backup.

The aggregation server sends the latest second weights to each training server.

Operation 434: The training server receives the second weights sent by the aggregation server to update the current weights.

In implementations, after the aggregation server backs up the newly obtained second weights, the method further includes:

Sub-operation C13: The aggregation server substitutes the second weights into a target model for outputting to a service server.

In implementations, the second weights of the backup may be directly substituted into a target model which is outputted to a service server, so that a service party can directly use the target model for uses.

The present disclosure has the following advantages.

(1) Lazy communication mechanism: According to a cluster environment and an iteration situation, a determination is automatically made as to whether all machines need to perform weight aggregation operations, to avoiding aggregation at each round of training which results in possible network fullness.

(2) Weight backup mechanism: According to rules, weights are automatically backed up. Once certain mechanisms have problems, previous weights can be pulled back from the backup and training can be continued, thus improving the efficiency of training can be improved without performing training from the beginning.

(3) Data segmentation apparatus: According to the timeliness of data, a weight of a new piece of data is automatically increased, a weight of an old piece of data is automatically reduced, and some old pieces of data are automatically discarded.

It should be noted that the method embodiments are all expressed as series of action combinations for the sake of simple description. However, one skilled in the art should understand that the embodiments of the present disclosure are not limited by the described orders of actions, because certain operations may be performed in other orders or concurrently in accordance with embodiments of the present disclosure. Moreover, one skilled in the art should also understand that the embodiments described in the specification are all preferred embodiments, and actions involved therein may not be necessarily required in implementations.

Figure 5:
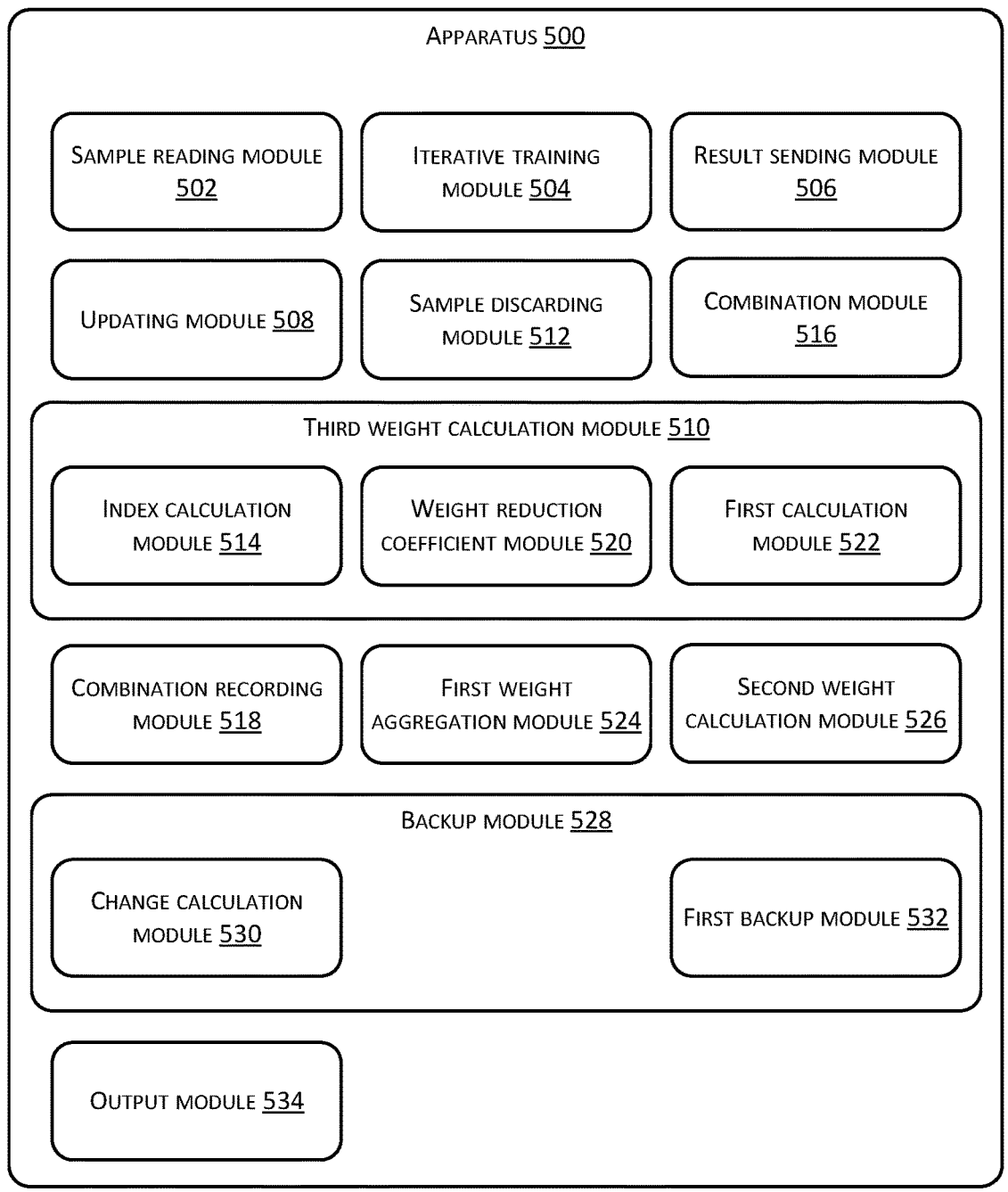
FIG. 5 is a structural block diagram of an embodiment of a distributed cluster training apparatus of the present disclosure.

Referring to FIG. 5, a structural block diagram of an embodiment of a distributed cluster training apparatus 500 of the present disclosure is shown, which may specifically include the following modules.

A sample reading module 502 is used for reading a sample set, the sample set including at least one piece of sample data.

An iterative training module 504 is used for using the sample data and current weights to substitute into a target model training function for iterative training to obtain a first gradient before receiving a collection instruction, the collection instruction being issued by a scheduling server when a cluster system environment meets a threshold condition, wherein first weights are generated based on first gradients obtained in a previous training and are used as current weights of a subsequent iteration of the iterative training, if multiple iterations of the training exist before receiving the collection instruction.

A result sending module 506 is used for sending the first gradient to an aggregation server if a collection instruction is received, wherein the aggregation server collects each first gradient and calculates second weights.

An updating module 508 is used for receiving the second weights sent by the aggregation server to update current weights.

In implementations, the collection instruction being issued by the scheduling server when the cluster system environment meets the threshold condition includes the collection instruction being issued by the scheduling server when a cluster network utilization rate of an entire cluster meets a first threshold condition, and/or being issued by the scheduling server when a cluster failure rate of the entire cluster meets a second threshold condition.

In implementations, the first threshold condition includes the cluster network utilization rate being lower than the first threshold.

The second threshold condition includes the cluster failure rate being lower than the second threshold.

In implementations, the apparatus 500 further includes a third weight calculation module 510 used for using time information of each piece of sample data to calculate a third weight of the respective piece of sample data; and a sample discarding module 512 used for discarding a corresponding piece of sample data when an associated weight is less than a third threshold.

In implementations, the third weight calculation module 510 includes an index calculation module 514 used for substituting the time information of each piece of sample data into a negative index parameter of an exponential function to calculate third weights.

In implementations, the apparatus 500 further includes a combination module 516 used for combining various pieces of sample data in the sample set; and a combination recording module 518 used for recording a number of combinations of the sample data for the combined sample data.

In implementations, the third weight calculation module 510 includes a weight reduction coefficient calculation module 520 used for calculating a weight reduction coefficient using the time information of each piece of sample data; a first calculation module 522 used for calculating a product of the weight reduction coefficient and the number of combinations to obtain the third weights.

In implementations, the result sending module 506 is further used for sending the first coefficient obtained by aggregating the third weights of each piece of sample data to the aggregation server if receiving the collection instruction.

The aggregation server includes a first weight aggregation module 524 used for performing a weighting calculation to obtain a second gradient based on each first gradient and a first coefficient corresponding to each first gradient; and a second weight calculation module 526 used for calculating second weights according to the second gradient.

In implementations, the aggregation server further includes a backup module 528 used for backing up the second weights that are newly obtained.

In implementations, the backup module 528 includes a change calculation module 530 used by the aggregation server for determining whether an amount of change between the newly obtained second weights and second weights of a previous backup exceeds a change threshold; and a first backup module 532 used for backing up the newly obtained second weights if the change threshold is exceeded.

In implementations, the apparatus 500 further includes an output module 534 used for substituting the second weights into a target model for outputting to a service server.

The present disclosure has the following advantages.

(1) Lazy communication mechanism: According to a cluster environment and an iteration situation, a determination is automatically made as to whether all machines need to perform weight aggregation operations, to avoiding aggregation at each round of training which results in possible network fullness.

(2) Weight backup mechanism: According to rules, weights are automatically backed up. Once certain mechanisms have problems, previous weights can be pulled back from the backup and training can be continued, thus improving the efficiency of training can be improved without performing training from the beginning.

(3) Data segmentation apparatus: According to the timeliness of data, a weight of a new piece of data is automatically increased, a weight of an old piece of data is automatically reduced, and some old pieces of data are automatically discarded.

Due to their basically similarities to the method embodiments, the description of the apparatus embodiments is relatively simple, and relevant parts can be referenced to the description of the method embodiments.

Fifth Embodiment

Figure 6:
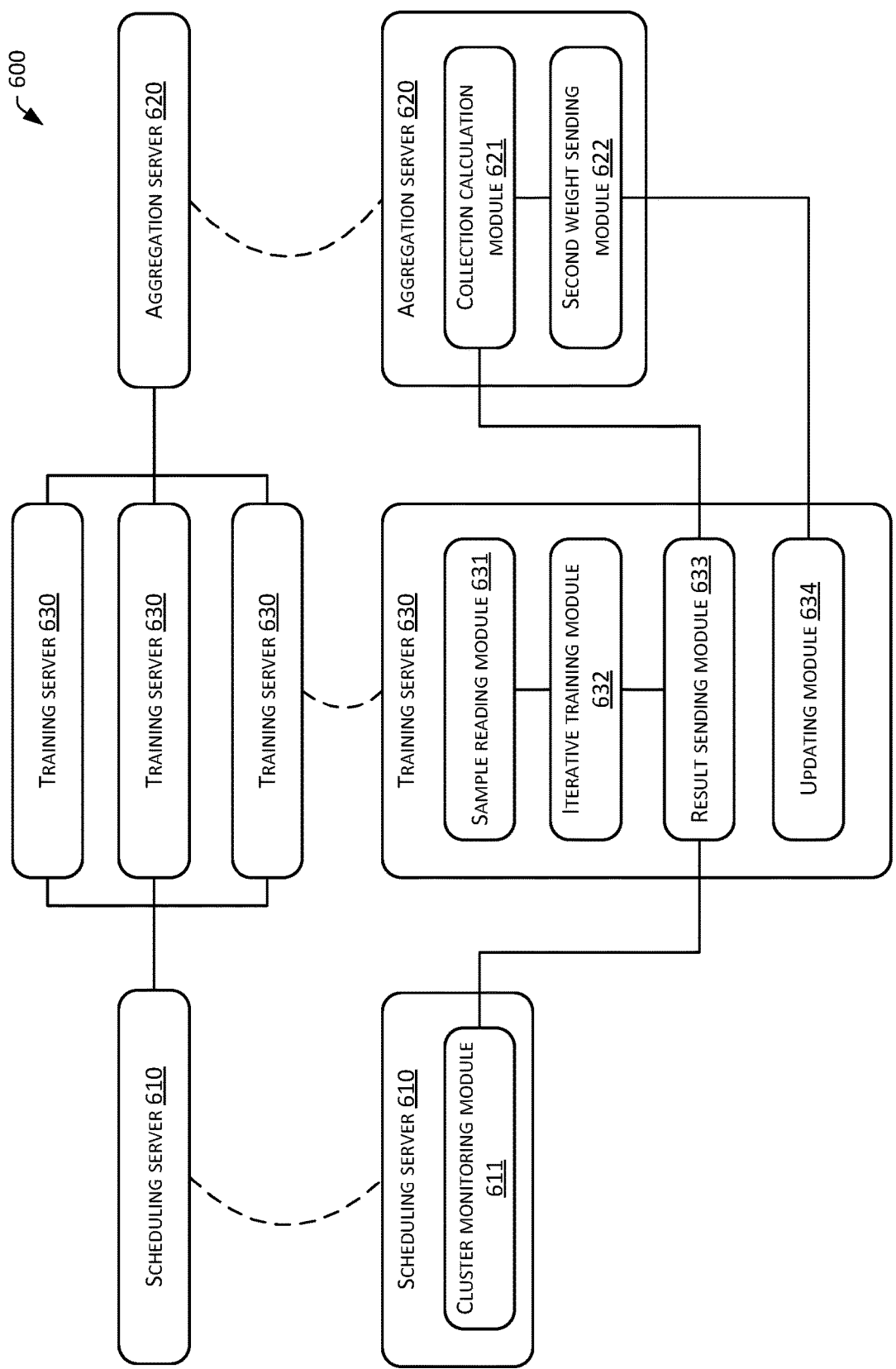
FIG. 6 is a structural block diagram of an embodiment of a distributed cluster training system of the present disclosure.

Referring to FIG. 6, a structural block diagram of an embodiment of a distributed cluster training apparatus 600 of the present disclosure is shown, which may specifically include the following modules.

A scheduling server 610, an aggregation server 620, and a plurality of training servers 630 are included.

The scheduling server 610 includes a cluster monitoring module 611 configured to monitor whether a cluster system environment meets a threshold condition, and send a collection instruction to each training server 630 if affirmative.

In implementations, the cluster monitoring module 611 is specifically configured to issue the collection instruction when a cluster network utilization rate of an entire cluster meets a first threshold condition, and/or to issue the collection instruction when a cluster failure rate of the entire cluster meets a second threshold.

In implementations, the first threshold condition includes the cluster network utilization rate being lower than the first threshold.

The second threshold condition includes the cluster failure rate being lower than the second threshold.

The training server 630 includes a sample reading module 631 configured to read a sample set, the sample set including at least one piece of sample data; an iterative training module 632 configured to perform iterative training on a target model training function using the sample data and current weights before receiving the collection instruction to obtain a first gradient, wherein first weights generated based on a first gradient obtained by a previous training are used as current weights of a subsequent round of iterative training if multiple rounds of iterative training exist before receiving the collection instruction; a result sending module 633 configured to send the first gradient to the aggregation server if the collection instruction is received; and an update module 634 configured to receive second weights to update the current weights.

In implementations, referring to FIG. 5 and FIG. 6, the apparatus 600 further includes a third weight calculation module 510 configured to calculate third weights of the sample data using time information of each piece of sample data; and a sample discarding module 512 configured to discard a corresponding piece of sample data when an associated third weight is less than a third threshold.

In implementations, the third weight calculation module 510 includes an index calculation module 514 configured to substitute the time information of each piece of sample data into a negative index parameter of an exponential function to calculate a respective third weight.

In implementations, referring to FIG. 5 and FIG. 6, the apparatus 600 further includes a combination module 516 for combining various pieces of sample data in the sample set; and a combination recording module 518 used for recording a number of combinations of the sample data for the combined sample data.

In implementations, the third weight calculation module 510 includes a weight reduction coefficient calculation module 520 used for calculating a weight reduction coefficient using the time information of each piece of sample data; a first calculation module 522 used for calculating a product of the weight reduction coefficient and the number of combinations to obtain the third weights.

In implementations, the result sending module 633 is further configured to send the first coefficient obtained by aggregating the third weights of each piece of sample data to the aggregation server if receiving the collection instruction.

The aggregation server 620 includes a collection calculation module 621 configured to aggregate each first gradient and calculate second weights; and a second weight sending module 622 configured to send most recent second weights to each training server.

In implementations, referring to FIG. 5 and FIG. 6, the aggregation server 620 includes a first weight aggregation module 524 configured to perform a weighting calculation to obtain a second gradient based on each first gradient and a first coefficient corresponding to each first gradient; and a second weight calculation module 526 configured to calculate second weights according to the second gradient.

In implementations, referring to FIG. 5 and FIG. 6, the aggregation server 620 further includes a backup module 528 for backing up the second weights that are newly obtained.

In implementations, the backup module 528 includes a change calculation module 530 configured to determine by the aggregation server whether an amount of change between the newly obtained second weights and second weights of a previous backup exceeds a change threshold; and a first backup module 532 configured to back up the newly obtained second weights if the change threshold is exceeded.

In implementations, referring to FIG. 5 and FIG. 6, the apparatus 600 further includes an output module 534 configured to substitute the second weights into a target model for outputting to a service server.

Figure 7:
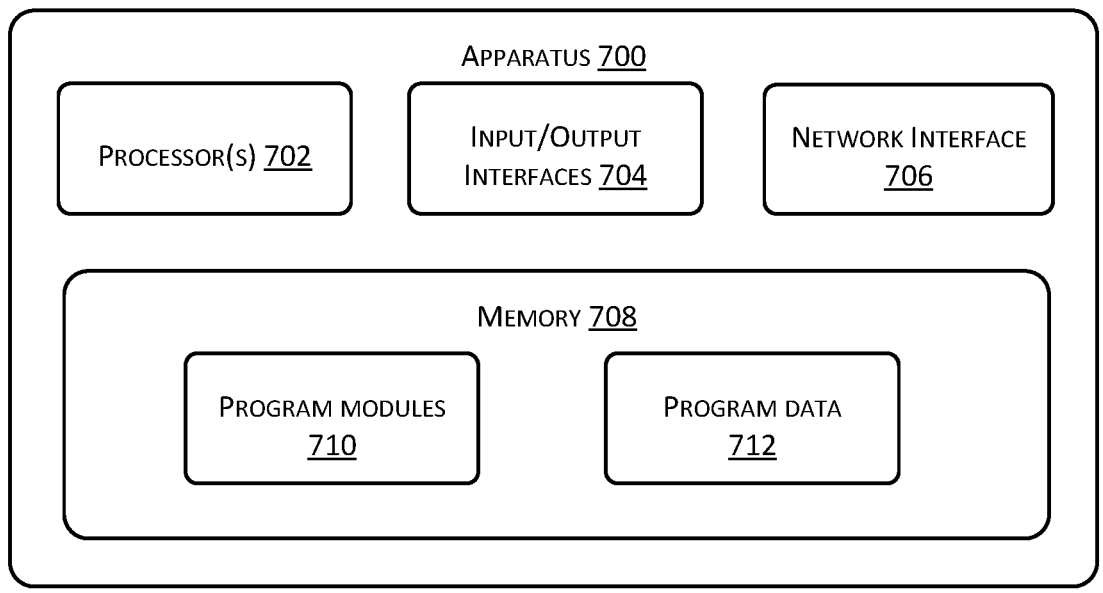
FIG. 7 is a structural block diagram of an example system in accordance with the present application.

FIG. 7 shows an example system 700 such as the apparatuses (e.g., apparatuses 500 and 600) and servers (e.g., scheduling server 610, aggregation server 620, and training server 630) as described in FIGS. 5 and 6. In implementations, the system 700 may include one or more computing devices. In implementations, the system 700 may be a part of one or more computing devices, e.g., implemented or run by the one or more computing devices. In implementations, the one or more computing devices may be located in a single place or distributed among a plurality of network devices over a network. In a typical configuration, a computing device includes one or more processors (CPU), an input/output interface, a network interface, and memory.

In implementations, the system 700 may include one or more processors 702, an input/output (I/O) interface 704, a network interface 706, and memory 708.

The memory 708 may include a form of computer readable media such as a volatile memory, a random access memory (RAM) and/or a non-volatile memory, for example, a read-only memory (ROM) or a flash RAM. The memory 708 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD)

or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 708 may include program modules 710 and program data 712. Depending on which the example system 700 represents (e.g., the apparatus 500, the apparatus 600, the scheduling server 610, the aggregation server 620, or the training server 630), the program modules 710 may include one or more of the foregoing modules as described in FIGS. 5 and 6.

Each embodiment in the present specification is described in a progressive manner, and each embodiment has an emphasis that is different from those of other embodiments. Same or similar parts among the embodiments can be referenced with each other.

One skilled in the art should understand that the embodiments of the present disclosure can be provided as a method, an apparatus, or a computer program product. Therefore, the embodiments of the present disclosure may take a form of a complete hardware embodiment, a complete software embodiment, or an embodiment that is a combination of software and hardware. Moreover, the embodiments of the present disclosure may take a form of a computer program product implemented in a form of one or more computer-usable storage media (which include, but are not limited to, a magnetic storage device, CD-ROM, an optical storage device, etc.) having computer-usable program codes embodied therein.

The embodiments of the present disclosure are described with reference to flowcharts and/or block diagrams of methods, terminal devices (systems), and computer program products according to the embodiments of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing terminal device to produce a machine, such that an apparatus is created for implementing functions specified in one or more flows of a flowchart and/or one or more blocks of a block diagram through an execution of the instructions by the processor of the computer or other programmable data processing terminal device.

These computer program instructions may also be stored in a computer readable storage device capable of directing a computer or other programmable data processing terminal device to operate in a specific manner, so that instructions stored in the computer readable storage device generate an article of manufacture including an instruction apparatus. The instruction apparatus implements functions specified in one or more flows of a flowchart and/or one or more blocks of a block diagram.

These computer program instructions may also be loaded onto a computer or other programmable data processing terminal device, such that a series of operating operations are performed on the computer or other programmable terminal device to generate a computer-implemented process. The instructions executed in the computer or other programmable terminal device provide operations for implementing functions specified in one or more flows of a flowchart and/or one or more blocks of a block diagram.

Although the preferred embodiments of the embodiments of the present disclosure have been described, one skilled in the art can make additional changes and modifications to these embodiments once the basic inventive concepts are learned. Therefore, the appended claims are intended to be interpreted as including the preferred embodiments and all changes and modifications that fall within the scope of the embodiments of the present disclosure.

Finally, it should also be noted that relational terms such as first and second, etc., are only used to distinguish one entity or operation from another entity or operation in the present text, and do not necessarily require or imply an existence of any such relationship or order between these operations or entities. Moreover, terms "include", "contain" or any other variations thereof are intended to cover a non-exclusive inclusion, such that a process, method, article, or terminal device that includes a series of elements includes not only these elements, but also includes other elements that are not explicitly listed, or also includes elements that are inherent in such process, method, article, or terminal device. Without any further limitation, an element defined by a statement "including a . . . " does not exclude a process, method, article, or terminal device including the element from further including another identical element.

Distributed cluster training methods and distributed cluster training apparatuses that are provided in the present disclosure are described in detail above. The present text uses specific examples for illustrating the principles and implementations of the present disclosure. The description of the above embodiments is merely used for facilitating the understanding of the methods and the core ideas of the present disclosure. At the same time, for one of ordinary skill in the art, changes can be made to specific implementations and application scopes based on the ideas of the present disclosure. In summary, the content of the present specification should not be construed as limitations to the present disclosure.

The present disclosure can be further understood using the following clauses.

Clause 1: A distributed cluster training method comprising: reading a sample set, the sample set including at least one piece of sample data; using the sample data and current weights to substitute into a target model training function for iterative training to obtain a first gradient before receiving a collection instruction, the collection instruction being issued by a scheduling server when a cluster system environment meets a threshold condition, wherein first weights are generated based on first gradients obtained in a previous training and are used as current weights of a subsequent iteration of the iterative training, if multiple iterations of the training exist before receiving the collection instruction; sending the first gradient to an aggregation server if a collection instruction is received, wherein the aggregation server collects each first gradient and calculates second weights; and receiving the second weights sent by the aggregation server to update current weights.

Clause 2: The method according to Clause 1, wherein the collection instruction being issued by the scheduling server when the cluster system environment meets the threshold condition comprises the collection instruction being issued by the scheduling server when a cluster network utilization rate of an entire cluster meets the first threshold condition, and/or being issued by the scheduling server when a cluster failure rate of the entire cluster meets a second threshold condition.

Clause 3: The method according to Clause 2, wherein: the first threshold condition comprises the cluster network utilization rate being lower than the first threshold; and the second threshold condition comprises the cluster failure rate being lower than the second threshold.

Clause 4: The method according to Clause 1, wherein the sample data includes time information, and after reading the sample set, the method further comprises: calculating third weights of the sample data using time information of each piece of sample data; and discarding a corresponding piece of sample data is discarded when an associated third weight is less than a third threshold.

Clause 5: The method according to Clause 4, wherein calculating the third weights of the sample data using the time information of each piece of sample data comprises substituting the time information of each piece of sample data being into a negative exponential parameter of an exponential function to calculate the third weights.

Clause 6: The method according to Clause 4, wherein before calculating the third weights of the sample data using the time information of each piece of sample data, the method further comprises: combining various pieces of sample data in the sample set; and recording respective numbers of combinations of the sample data for the combined sample data.

Clause 7: The method according to Clause 6, wherein calculating the third weights of the sample data using the time information of each piece of sample data comprises: using the time information of each piece of sample data to calculate a weight reduction coefficient; and calculating a product of the weight reduction coefficient and the respective numbers of combinations to obtain the third weights.

Clause 8: The method according to Clause 4, wherein: if the collection instruction is received, the method further comprises sending a first coefficient obtained by aggregating the third weights of each piece of sample data to the aggregation server, and wherein the aggregation server aggregating each first gradient and calculating the second weights comprises: performing a weighting calculation to obtain a second gradient based on each first gradient and a first coefficient corresponding to each first gradient; and calculating the second weights from the second gradient.

Clause 9: The method according to any one of Clauses 1-8, wherein after the aggregation server aggregates each first gradient and calculates the second weights, the method further comprises the aggregation server backing up the second weights that are newly obtained.

Clause 10: The method according to Clause 9, wherein the aggregation server backing up the second weights that are newly obtained comprises: the aggregation server determining whether N amount of change between the second weights that are newly obtained and second weights of a previous backup exceeds a change threshold; and backing up the second weights that are newly obtained if the change threshold is exceeded.

Clause 11: The method according to Clause 9, wherein after the aggregation server backs up the second weights that are newly obtained, the method further comprises substituting the second weights into a target model for outputting to a service server.

Clause 12: A distributed cluster training apparatus comprising: a sample reading module used for reading a sample set, the sample set including at least one piece of sample data; an iterative training module used for using the sample data and current weights to substitute into a target model training function for iterative training to obtain a first gradient before receiving a collection instruction, the collection instruction being issued by a scheduling server when a cluster system environment meets a threshold condition, wherein first weights are generated based on first gradients obtained in a previous training and are used as current weights of a subsequent iteration of the iterative training, if multiple iterations of the training exist before receiving the collection instruction; a result sending module used for sending the first gradient to an aggregation server if a collection instruction is received, wherein the aggregation server collects each first gradient and calculates second weights; and an updating module used for receiving the second weights sent by the aggregation server to update current weights.

Clause 13: The apparatus according to Clause 12, wherein the collection instruction being issued by the scheduling server when the cluster system environment meets the threshold condition comprises the collection instruction being issued by the scheduling server when a cluster network utilization rate of an entire cluster meets the first threshold condition, and/or being issued by the scheduling server when a cluster failure rate of the entire cluster meets a second threshold condition.

Clause 14: The apparatus according to Clause 13, wherein: the first threshold condition comprises the cluster network utilization rate being lower than the first threshold; and the second threshold condition comprises the cluster failure rate being lower than the second threshold.

Clause 15: The apparatus according to Clause 12, wherein: after the sample reading module, the apparatus further comprises: a third weight calculation module used for calculating third weights of the sample data using time information of each piece of sample data; and a sample discarding module used for discarding a corresponding piece of sample data is discarded when an associated third weight is less than a third threshold.

Clause 16: The apparatus according to Clause 15, wherein the third weight calculation module comprises an index calculation module used for substituting the time information of each piece of sample data being into a negative exponential parameter of an exponential function to calculate the third weights.

Clause 17: The apparatus according to Clause 15, wherein before the third weight calculation module, the apparatus further comprises: a combination module used for combining various pieces of sample data in the sample set; and a combination recording module used for recording respective numbers of combinations of the sample data for the combined sample data.

Clause 18: The apparatus according to Clause 17, wherein the third weight calculation module comprises: a reduction coefficient calculation module used for using the time information of each piece of sample data to calculate a weight reduction coefficient; and a first calculation module used for calculating a product of the weight reduction coefficient and the respective numbers of combinations to obtain the third weights.

Clause 19: The apparatus according to Clause 15, wherein the result sending module is further used for sending a first coefficient obtained by aggregating the third weights of each piece of sample data to the aggregation server if the collection instruction is received, and the aggregation server comprises: a first weight aggregation module used for performing a weighting calculation to obtain a second gradient based on each first gradient and a first coefficient corresponding to each first gradient; and a second weight calculation module used for calculating the second weights from the second gradient.

Clause 20: The apparatus according to any one of Clauses 12-19, wherein the aggregation server further comprises a backup module used for backing up the second weights that are newly obtained.

Clause 21: The apparatus according to Clause 9, wherein the backup module comprises: a change calculation module used for the aggregation server determining whether an amount of change between the second weights that are newly obtained and second weights of a previous backup exceeds a change threshold; and a first backup module used for backing up the second weights that are newly obtained if the change threshold is exceeded.

Clause 22: The apparatus according to Clause 20, wherein after the backup module, the apparatus further comprises an output module used for substituting the second weights into a target model for outputting to a service server.

What is claimed is:

1. A method implemented by one or more computing devices, the method comprising:
   reading, by a training server of a plurality of training servers in a distributed cluster training system, a sample set, the sample set including at least one piece of sample data
   using, by the training server, the sample data and current weights to substitute into a target model training function for iterative training to obtain a first gradient before receiving a collection instruction, the collection instruction being issued by a scheduling server when a cluster system environment meets a threshold condition, wherein first weights are generated by the training server based on the first gradient obtained in a previous training and are used as the current weights of a subsequent iteration of the iterative training, in response to determining that multiple iterations of the training exist before the training server receives the collection instruction;
   sending, by the training server, the first gradient to an aggregation server in response to determining that a collection instruction is received from the scheduling server, wherein the aggregation server collects a plurality of first gradients from the plurality of training servers and calculates second weights; and
   receiving, by the training server, the second weights sent by the aggregation server to update the current weights.

2. The method according to claim 1, wherein the collection instruction being issued by the scheduling server when the cluster system environment meets the threshold condition comprises the collection instruction being issued by the scheduling server when a cluster network utilization rate of an entire cluster meets the first threshold condition, and/or being issued by the scheduling server when a cluster failure rate of the entire cluster meets a second threshold condition.

3. The method according to claim 2, wherein:
   the first threshold condition comprises the cluster network utilization rate being lower than the first threshold; and
   the second threshold condition comprises the cluster failure rate being lower than the second threshold.

4. The method according to claim 1, wherein the sample data includes time information, and after reading the sample set, the method further comprises:
   calculating third weights of the sample data using time information of each piece of sample data; and
   discarding a corresponding piece of sample data is discarded when an associated third weight is less than a third threshold.

5. The method according to claim 4, wherein calculating, by the training server, the third weights of the sample data using the time information of each piece of sample data comprises substituting the time information of each piece of sample data into a negative exponential parameter of an exponential function to calculate the third weights.

6. The method according to claim 4, wherein before calculating, by the training server, the third weights of the sample data using the time information of each piece of sample data, the method further comprises:
   combining various pieces of sample data in the sample set; and
   recording respective numbers of combinations of the sample data for the combined sample data.

7. The method according to claim 6, wherein calculating, by the training server, the third weights of the sample data using the time information of each piece of sample data comprises:
   using the time information of each piece of sample data to calculate a weight reduction coefficient; and
   calculating a product of the weight reduction coefficient and the respective numbers of combinations to obtain the third weights.

8. The method according to claim 4, wherein: in response to determining that the collection instruction is received, the method further comprises sending a first coefficient obtained by aggregating the third weights of each piece of sample data to the aggregation server, and wherein the aggregation server aggregating each first gradient and calculating the second weights comprises:
   performing a weighting calculation to obtain a second gradient based on each first gradient and a first coefficient corresponding to each first gradient; and
   calculating the second weights from the second gradient.

9. The method according to claim 1, wherein after the aggregation server aggregates the plurality of first gradients and calculates the second weights, the method further comprises backing up, by the aggregation server, the second weights that are newly obtained.

10. The method according to claim 9, wherein backing up, by the aggregation server, the second weights that are newly obtained comprises:
    the aggregation server determining, by the aggregation server, whether an amount of change between the second weights that are newly obtained and second weights of a previous backup exceeds a change threshold; and
    backing up the second weights that are newly obtained in response to determining that the amount of change exceeds the change threshold.

11. The method according to claim 9, wherein after the aggregation server backs up the second weights that are newly obtained, the method further comprises substituting the second weights into a target model for outputting to a service server.

12. An apparatus comprising:
    one or more processors;
    memory;
    a sample reading module stored in the memory and executable by the one or more processors to read a sample set, the sample set including at least one piece of sample data;
    an iterative training module stored in the memory and executable by the one or more processors to use the sample data and current weights to substitute into a target model training function for iterative training to obtain a first gradient before receiving a collection instruction, the collection instruction being issued by a scheduling server when a cluster system environment meets a threshold condition, wherein first weights are generated based on the first gradient obtained in a previous training and are used as current weights of a subsequent iteration of the iterative training, in response to determining that multiple iterations of the training exist before receiving the collection instruction;

a result sending module stored in the memory and executable by the one or more processors to send the first gradient to an aggregation server in response to determining that a collection instruction is received, wherein the aggregation server collects a plurality of first gradients and calculates second weights; and an updating module stored in the memory and executable by the one or more processors to receive the second weights sent by the aggregation server to update the current weights.

13. The apparatus according to claim 12, wherein the collection instruction being issued by the scheduling server when the cluster system environment meets the threshold condition comprises the collection instruction being issued by the scheduling server when a cluster network utilization rate of an entire cluster meets the first threshold condition, and/or being issued by the scheduling server when a cluster failure rate of the entire cluster meets a second threshold condition.

14. The apparatus according to claim 13, wherein:
the first threshold condition comprises the cluster network utilization rate being lower than the first threshold; and
the second threshold condition comprises the cluster failure rate being lower than the second threshold.

15. The apparatus according to claim 12, further comprising:
a third weight calculation module used for calculating third weights of the sample data using time information of each piece of sample data; and
a sample discarding module used for discarding a corresponding piece of sample data is discarded when an associated third weight is less than a third threshold.

16. The apparatus according to claim 15, wherein the third weight calculation module comprises an index calculation module used for substituting the time information of each piece of sample data being into a negative exponential parameter of an exponential function to calculate the third weights.

17. The apparatus according to claim 15, further comprising:
a combination module used for combining various pieces of sample data in the sample set; and a combination recording module used for recording respective numbers of combinations of the sample data for the combined sample data.

18. The apparatus according to claim 17, wherein the third weight calculation module comprises:
a reduction coefficient calculation module used for using the time information of each piece of sample data to calculate a weight reduction coefficient; and
a first calculation module used for calculating a product of the weight reduction coefficient and the respective numbers of combinations to obtain the third weights.

19. The apparatus according to claim 15, wherein the result sending module is further used for sending a first coefficient obtained by aggregating the third weights of each piece of sample data to the aggregation server in response to determining that the collection instruction is received, and the aggregation server comprises:
a first weight aggregation module used for performing a weighting calculation to obtain a second gradient based on each first gradient and a first coefficient corresponding to each first gradient; and
a second weight calculation module used for calculating the second weights from the second gradient.

20. One or more computer readable media storing executable instructions that, when executed by one or more processors, cause the one or more processors to perform acts comprising:
reading, by a training server of a plurality of training servers in a distributed cluster training system, a sample set, the sample set including at least one piece of sample data;
using, by the training server, the sample data and current weights to substitute into a target model training function for iterative training to obtain a first gradient before receiving a collection instruction, the collection instruction being issued by a scheduling server when a cluster system environment meets a threshold condition;
sending, by the training server, the first gradient to an aggregation server in response to determining that a collection instruction is received, wherein the aggregation server collects a plurality of first gradients from the plurality of training servers and calculates second weights; and
receiving, by the training server, the second weights sent by the aggregation server to update the current weights.

* * * * *